Dec. 14, 1971     C. L. MORGAN     3,627,560
SELF-CLEANING COOKING APPARATUS
Original Filed Jan. 13, 1969

INVENTOR
CURTIS L. MORGAN
BY
ATTORNEYS

United States Patent Office 3,627,560
Patented Dec. 14, 1971

3,627,560
SELF-CLEANING COOKING APPARATUS
Curtis L. Morgan, Sigel, Ill., assignor to
Fedders Corporation, Edison, N.J.
Original application Jan. 13, 1969, Ser. No. 790,772, now Patent No. 3,545,423, dated Dec. 8, 1970. Divided and this application Apr. 27, 1970, Ser. No. 43,266
Int. Cl. A21b 1/00
U.S. Cl. 117—70 B
6 Claims

ABSTRACT OF THE DISCLOSURE

A self-cleaning surface for a cooking apparatus comprising a two-layer coating on a metal surface, the first coating being a mixture of a ceramic and a catalytically active material with a second coating of catalytically active material. A method for forming a self-cleaning surface for a cooking apparatus including the application of the catalyst in a slurry having a material convertible to a high temperature binding material.

CROSS-REFERENCES TO RELATED APPLICATIONS

This application is a division of application Ser. No. 790,772, filed Jan. 13, 1969, now U.S. Pat. No. 3,545,423.

BACKGROUND OF THE INVENTION

A self-cleaning cooking apparatus is described in U.S. Pat. No. 3,266,477—Stiles, wherein a catalytically active material is coated onto the exposed surfaces of a cooking apparatus. Similarly, that patent describes a method for forming these self-cleaning surfaces.

Among the methods recited by this patent for forming the catalytically active surface is the formation of a ceramic coating on a metal sheet and the partial embedding of the catalyst in this coating. In some circumstances, a further inorganic material is used, so that a catalyst carrier is embedded in the ceramic, rather than directly embedding the catalyst material, itself. The catalyst is then applied to this catalyst carrier to form the final product.

While, in general, this apparatus and method provide a surface which adequately performs its function of cleaning food spills which come in contact with the surfaces through the application of moderate temperatures, i.e., 350° F. or, preferably, 400° F. to 500° F., or more, the apparatus produced does not completely perform the intended function under conditions of actual use.

SUMMARY OF THE INVENTION

In accordance with the present invention, a novel surface structure for use in cooking apparatus and a method for forming that novel surface on a cooking apparatus have been found, the surface being self-cleaning under moderate temperature conditions.

The exposed surfaces of the cooking apparatus, according to the present invention, have a two-layer coating which provides both the active catalyst surface necessary for self-cleaning and, at the same time, a firm bond between the active catalyst and the cooking apparatus surfaces. The first layer is formed from any of the standard ceramics presently employed in coating the metal portions of a cooking apparatus along with a catalytically active material and a binder for this material. This binder must be one which is effective at the temperatures normally employed in cooking apparatus. The second layer of the system is a catalytically active material, mechanically bonded to the catalytic portion of the first layer which is concentrated at the surface of the first layer.

The active catalyst portion of the coating of the present invention is applied to both the first layer and the second layer in the form of a slurry. This slurry contains, in addition to the catalytically active material, a binder. The binder is one which is fluid or solubilizable at the temperatures of application and, at that temperature, has little bonding activity, but which, on treatment of the coating to provide the firm adherence, converts to a high temperature bonding agent.

It is thus an object of this invention to provide a self-cleaning cooking apparatus having a firmly bonded catalytic surface.

It is a further object of this invention to provide a method for forming a self-cleaning cooking apparatus having a firmly adhered catalytic surface.

DESCRIPTION OF THE PREFERRED EMBODIMENTS

Figure 1:
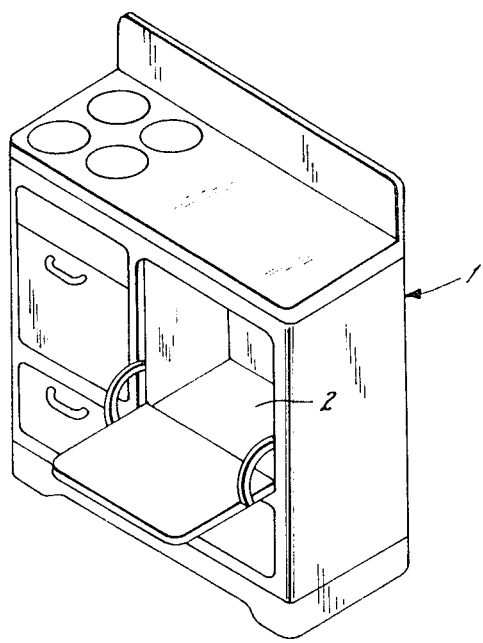
FIG. 1 is a conventional household stove, illustrative of a cooking device to which the present invention is applicable.
Figure 2:
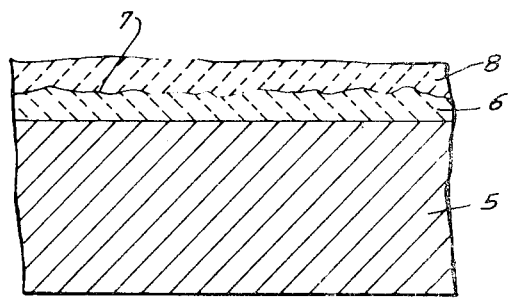
FIG. 2 is a schematic representation of the firmly adhered catalytic surface for such a cooking apparatus in accordance with the present invention.

Referring particularly to the drawings, FIG. 1 illustrates a household stove 1 having an oven portion 2. The walls of this oven portion are coated according to the present invention. The structure of this coating is more clearly illustrated in FIG. 2 wherein the oven wall portion, prior to coating, is shown as the metal 5. A first coating 6 formed, in a particular manner, from a ceramic material and a catalyst slurry is applied directly to this metal. The surface of this coating opposite the metal has a toothed surface 7. To this toothed surface is applied a second catalyst coat 8, this last coat providing the major activity for the self-cleaning function of the coating.

The metal walls of the oven can be any suitable material of construction, including those normally employed for these purposes. Thus, these walls can be formed of iron, iron alloys and steel, or any of the various alloys of these materials including stainless steel having various ratios of iron, chromium, and nickel. The metal can also be a chromium-nickel alloy or aluminum or an alloy of aluminum. These metal walls can also be formed with two layers of metal as, for example, galvanized iron or copper, or aluminum clad iron or stainless steel. The two-layer metals, when employed, can also be formed by electroplating, such as the plating or coating of copper, chromium, or other metals onto iron, steel, or the other metals suggested for this purpose.

The ceramic which is applied to the metal wall as a portion of the first coating layer can be any of those normally used in coating the walls of cooking appliances, as at present. Numerous materials of this type are described in the book by E. E. Bryant, "Porcelain Enameling Operations," Enamelist Publishing Company, Cleveland, Ohio, revised edition, 1964. The enamels selected for this process should have glass melting temperatures somewhat above 1450° F. and preferably in the range of about 1500° F.

The catalyst is applied in both the first and second layers as a relatively thick water slurry containing the catalyst and a material convertible to a high temperature binding agent. The catalysts which are useful are generally those described in the aforementioned Stiles patent. These catalysts are effective above 275° F. or, more preferably, between about 350° F. and 500° F., though their catalytic activity is still present at temperatures somewhat above 500° F.

More specifically, the catalytic materials which are useful in oxidizing food spills on the cooking surfaces can be any of the catalytically active compounds of copper, tin, vanadium, nobium, bismuth, chromium, molybdenum, tungsten, manganese, rhenium, iron, cobalt, nickel, and the rare earth metals, such as cerium. The precious metals, ruthenium, rhodium, palladium, platinum, and compounds of these precious metals can also be employed. In general, the various catalytic metals will be used in the forms of their oxides, cerates, manganates, manganites, chromates, chromites, or vanadates.

Especially preferred catalysts, because of their comparatively high activity at low temperatures, are ruthenium, palladium, and platinum metals, and the oxides, cerates, manganates, manganites, chromates, chromites, and vanadates of cobalt, nickel, ruthenium, palladium, platinum, and the rare earth metals.

The material convertible to a binding agent which is employed in the slurry is one which is fluid, or at least soluble, at the temperature of application of the catalytic slurry, which is generally room temperature, but which breaks down under the temperatures employed for application of the coatings in order to form an agent which firmly binds the catalyst in the structure without destroying the catalytic activity. One example of such a material is titanium lactate which can be added to the slurry in the form of a solution. At the temperatures employed in forming the coating system of the present invention, this lactate is decomposed, resulting in the production of titanium dioxide which acts to bind the catalysts of the present invention at the temperature of their catalytic activity, i.e., 275° F. and above, without seriously impairing the catalytic activity. Similarly, other materials can be employed in the slurry which form binding agents, such as silicon dioxide, on decomposition at high temperatures.

The slurry formed for use in the present invention preferably has about the following composition:

| | Percent |
|---|---|
| Catalyst (active material) | 49.5–60.5 |
| Water | 33.0–40.0 |
| High temperature binding agent (in final form) | 0.36–1.10 |
| Wetting agent | 1.25–1.5 |

Thus, the ratio of active catalyst material to high temperature binding agent, with the high temperature binding agent in its final form, should be approximately 45–70 to 1. The amount of material added to the slurry in order to produce this final amount and ratio of high temperature binding agent may, of course, be higher or lower than the percentages recited, the percentage in final form being the critical factor.

The wetting agent employed in the slurry for ease of application can be selected from a wide variety of materials. Preferably, the material is glycerol, but it can also be another polyol or any of various detergents, so long as the detergent does not interfere with the catalyst activity or with the formation of the high temperature binding agent. Further, any detergent or other wetting agent employed must be such that it is removed from the coating under the heating conditions employed for formation of the catalyst coating. Thus, after application of the slurry, and during the various heatings to apply the coatings, not only does the high temperature binding agent achieve its final form, but the wetting agent and water are evaporated. The material finally remaining from an application of this slurry, after processing, is the catalyst and a high temperature binding agent resulting from a decomposition of the material originally applied in the slurry.

The water employed in the slurry is preferably deionized or distilled water. This preference is in order to avoid mineral contamination of the slurry which might result in an uneven or less active coating.

The coating is formed, generally, by the following series of steps:

(1) Clean the metal base sheet.
(2) Apply a standard porcelain frit to the base sheet.
(3) Dry the frit, by methods normally employed in the art, to a bisque.
(4) Apply a coating of the catalytic slurry described above to the bisque.
(5) Dry the applied slurry.
(6) Fire the bisque-slurry at a temperature sufficient to fuse the porcelain frit.
(7) Coat the resulting material with a second layer of the catalytic slurry.
(8) Fire the second coating at a temperature sufficient to form the high temperature binding agent from the material applied in the slurry.

The result is a firmly bonded catalytic structure, the surface of which has a catalytic activity approaching 100%.

The slurry form of the catalyst prevents it, in the case of the first coating, from sinking into the bisque during the heating operation, while with the second layer, the catalyst is prevented from sinking through the entire first layer.

The cleaning of the metal surface which is to be coated with the ceramic and the catalyst material will vary with the type and condition of metal employed. Thus, with a normal steel sheet, standard pickling processes can be used. Other methods of cleaning the metal surface so as to provide for adherence of the ceramic coating are generally well known in the art.

The temperature at which the high temperature binding agent is formed from the material actually added to the slurry varies with the binding agent which is to be formed and the material employed. For example, when titanium lactate is used to form titanium dioxide, a firing temperature in step 8 of approximately 500° F. is necessary. Correspondingly, when sodium silicate is employed to form silicon dioxide, a firing temperature in step 8 of approximately 400° F. is sufficient.

Drying of the first applied slurry layer in step 5 is a preferred step in the method of the present invention. However, this step can be omitted without departing from the present invention. By removing the water through drying at a temperature between room temperature and 150° F., the number of voids formed in the final ceramic layer is diminished. Should additional voids be desired for any purpose, then this drying step can be omitted.

The bisque and the first layer of slurry are fired at a temperature which is sufficient to fuse the bisque layer. Generally, with most of the ceramics employed in forming these coatings, this temperature will be in the range of from about 1000° F. to 1800° F. During this firing, in addition to fusing the ceramic, the slurry layer physically interacts with the fusing ceramic, to some degree, so as to be embedded in the surface of the ceramic. However, the catalytic material does not become sufficiently absorbed or embedded in the ceramic to reach the metal surface on which the ceramic is applied. The first layer, after firing, has a rough, toothed surface, with a catalytic activity of approximately 20%. The toothed surface which forms is important for a purpose to be more fully described hereinafter.

While not wishing to be bound by theory, it appears that the firing of the first catalyst layer, together with the ceramic bisque, results in a violent reaction, particularly in the ceramic, causing the formation of large gas bubbles within the ceramic. A very small portion of the catalyst layer nearest the ceramic dissolves in the ceramic and the violent reaction is believed to cause the rough, toothed surface on the surface of this catalyst. There is also some evidence of fusion between the catalyst and the ceramic at this level. Though the reaction is violent and results in the rough, toothed surface, this surface is even, in that the distance from the surface to the metal plate is relatively constant at any point along the plate.

The second catalyst layer is sprayed over the toothed surface in a thin, uniform layer. The same slurry as described for use in the first layer is employed. Employing the titanium lactate slurry previously referred to, heating at a temperature of about 500° F. for approximately 20 minutes results in a complete decomposition of the lactate. For other high temperature bonding agents, higher or lower temperatures may be necessary or desirable. The residue from this decomposition is a small amount of carbon but, more importantly, a larger percentage of titanium dioxide. This titanium dioxide results in a cohesive second layer. The second layer is firmly bonded to the first layer through the mechanical bonding of the rough, toothed surface of the first layer.

It is important that the catalyst slurry be applied, in both the first and second layers, by airless methods. Thus, it can be applied by a spinning disk or by an airless gun. This method of application is important in order to avoid the inclusion of air spaces within the catalyst surface which would diminish both the area of catalyst coverage and the activity of the catalyst. Therefore, methods of application such as by brushing, etc., should be avoided, if at all possible.

Figure 3:
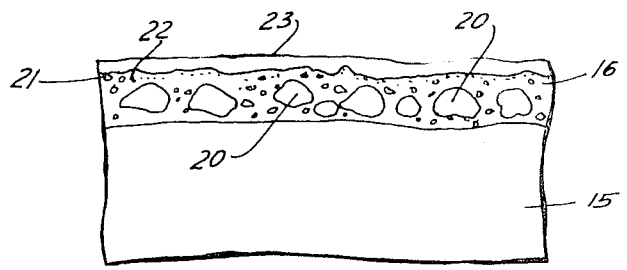
FIG. 3 is a detailed view, in section of the two-coat catalyst system bonded to a steel surface.

FIG. 3 shows the structure of the two-layer catalyst coating after firing including the manner in which the first catalyst layer is embedded in the ceramic. A steel plate 15 is shown with the ceramic coating 16, a series of voids 20 being formed in the ceramic. The first catalyst layer, in part, forms a coating 21 on the ceramic, with the remainder of the catalyst 22 being partially embedded near the surface of the ceramic. None of the catalyst is adjacent the surface of the steel which is coated. The second catalyst layer 23 is mechanically bonded to the surface of the ceramic-first catalyst layer and retains its integrity.

While the 500° firing temperature is necessary to develop the cohesive surface for the second layer, employing titanium lactate and, more importantly, to develop a catalyst surface with 100% activity, this firing and even the use of the binder is not sufficient to bind the second layer firmly to the first. It is for this reason that the rough, toothed surface is necessary on the first layer. When the second layer is cured through the heating action, the developed cohesiveness is sufficient to interlock the second layer with the first, through the rough teeth on the first layer.

In general, the thickness of the various layers is not important. Each of these layers, the original ceramic frit and the catalyst slurry which are empolyed to form the first layer, and the catalyst coating, alone, for the second layer, should be as this as possible. In general, the porcelain ceramic coating should be applied with a thickness of from about 1 to 3½ mils. Any ceramic coating thinner than this has a tendency to burn off during firing, while a coating of significantly greater thickness would be too fragile. Each of the catalyst coatings are preferably from about ½ to 3 mils. in thickness, with the first catalyst coating preferably being about ½ mil. less in thickness than the thickness of ceramic coating in order to preclude the catalyst from falling through the ceramic and contacting the metal plate on which the coating is formed, during firing.

With the structure of catalytic coating employed in the present invention not only is the catalytic material more firmly bonded than with the structures of the prior art, but, additionally damage to the catalytic coating is not as serious a problem as with the prior art. Even if the second layer of catalyst is scraped in such a way that this second layer is removed from the structure, some catalytic activity remains, due to the approximately 20% catalytic activity present in the first layer. Further, as the first layer is, in general, a series of voids, pressure on the second catalyst layer is more likely to force this catalyst deeper into the pores of the ceramic, than to remove it from the structure.

The curing temperature employed in the second coating must be lower than the softening point of the first coating, to prevent destruction of the only partial embedment of the catalyst of the first coating in the ceramic and also to prevent destruction of the porous system. The curing temperature must be high enough, however, in order to chemically convert the material added to the slurry to the high temperature binder which acts to form the stronger second coating.

The following examples are illustrative of the structure and process of the invention and should not be considered as limiting in any way the full scope of the invention as covered by the appended claims.

EXAMPLE 1

This example is meant to describe the method of forming a catalyst slurry for use in the present invention. Into a porcelain lined ball mill are placed 100 parts of a rare earth oxide catalyst consisting, primarily, of cerium oxide in a powder form, 53.7 parts of de-ionized water, 25.6 parts of a titanium lactate solution having a concentration of 50% and 300 parts of ½ inch Burundum cylinders. The mill is started and grinding continues until only a trace of a 100 gram sample is retained on a 325 mesh screen. When this test has been met, 2.56 parts of glycerol are added and milling is continued for about an additional 30 minutes.

The slurry produced by this process has a solids content of approximately 56%. This slurry can be employed for applying the catalyst in both the first and second layers of the two-layer coating.

EXAMPLE 2

A 14 inch by 18 inch panel of enameling iron, 0.498 inch in thickness, was coated with a 0.002 inch thick coating of ceramic. The ceramic was a ground coat porcelain enamel as shown on page 24 of the previously referenced Bryant text. The ceramic applied to the metal plate was dried at a temperature of 350° F. for ten minutes until a bisque was formed. A 0.001 inch thick coating of the catalyst slurry described in Example 1 was applied to the bisque by spraying and the metal panel now coated with the bisque and an applied layer of the catalyst slurry was heated at a temperature of 1500° F. for about 3.5 minutes. When the coated metal panel was removed from the oven, it was found to have a hard rough, but even surface. A portion of this panel was cut away and the catalyst coating was tested by applying a drop of beef fat and heating for 30 minutes at 500° F. The panel was found to remove a portion of the applied beef fat, showing the presence of catalytic activity.

The remainder of the panel was coated with a second application of the catalyst slurry described in Example 1 to a level of 0.003 inch, again by spraying. The now twice coated panel was heated at a temperature of 500° F. for 20 minutes. Following this heating period, the catalyst coating was found to have a smooth, black matte finish.

EXAMPLE 3

12 inch by 14 inch panel of 0.039 inch thick aluminized steel was coated with a 0.002 inch thick coating of ceramic. This ceramic was a low temperature porcelain enamel as described on page 98 of the aforementioned Bryant text. The ceramic applied to the metal plate was dried at a temperature of 350° F. for ten minutes until a bisque was formed. A 0.0015 inch thick coating of the catalyst slurry described in Example 1 was applied to the bisque by spraying and the metal panel, now coated with the bisque and an applied layer of the catalyst slurry, was heated at a temperature of 1000° F. for about 3 minutes.

The remainder of the panel was coated with a second application of the catalyst slurry described in Example 1 to a level of 0.0025 inch, again by spraying. The now twice coated panel was heated at a temperature of 500° F. for 20 minutes. Following this heating period, the catalyst coating was found to have a smooth, black matte finish.

EXAMPLE 4

A 16 inch by 20 inch panel of 0.0598 inch thick cold rolled steel was coated with a 0.002 inch thick coating of ceramic. This ceramic was a ground coat porcelain enamel as described on page 100 of the Bryant text. The ceramic applied to the metal plate was dried at a temperatuure of 400° F. for 15 minutes until a bisque was formed. A 0.0015 inch thick coating of the catalyst slurry described in Example 1 was applied to the bisque by spraying and the metal panel, now coated with the bisque and an applied layer of the catalyst slurry, was heated at a temperature of 1500° F. for about 3.5 minutes.

The remainder of the panel was coated with a second application of the catalyst slurry described in Example 1 to a level of 0.0025 inch, again by spraying. The now twice coated panel was heated at a temperature of 500° F. for 20 minutes. Following this heating period, the catalyst coating was found to have a smooth, black matte finish.

EXAMPLE 5

Adherence of the first layer, combining the ceramic portion and the first catalyst layer is tested by clamping a 4 inch by 6 inch plate, formed according to Example 3, into a test fixture with the catalyst side up. A 2.5 pound, round ended weight was suspended 36 inches above the plate. The weight was allowed to free fall and strike the surface. A portion of the frit and catalyst, in the vicinity of the point where the weight fell, was removed and the exposed steel had a matte, dull appearance.

A similar test was made on a similar panel, but a panel which was fired at only 750° F. A larger portion of the frit-catalyst blend was removed and the exposed steel had a smooth, shiny appearance.

EXAMPLE 6

The plate with the two-layer coating described in Example 2 was subjected to a Hoffman Scratch Hardness test. The tester was drawn across the surface of this plate, with a zero load, for a distance of about 4 inches. The surface was only lightly scratched and there was no breakthrough to the metal or enamel substrates. Under microscopic examination, the edges of the scratch were uniform with a width of less than 0.04 inch.

A similar test was run on a panel prepared according to the aforementioned Stiles patent. Similar testing showed the evidence of "plowing" and there was breakthrough from the catalyst surface to the underlying metal substrate. Under microscopic examination, the edges of the scratch were ragged and the scratch was approximately 0.05 inch in width.

EXAMPLE 7

A 4 inch by 6 inch test plate formed in accordance with Example 2 was tested for catalytic activity. One drop each of hamburger fat, ham fat, and sausage fat, extracted by roasting these meats in a covered dish, were applied to this plate. The test plate was heated at 375° F. for one hour and showed evidence of diminishment of the soiled spots.

The plate was further tested at 400° F. for approximately an additional 1.5 hours. At this time, examination of the panel showed complete removal of all three spots.

While specific embodiments of the invention have been shown and described, the invention should not be limited to these specific compositions and processes. It is intended, therefore, by the appended claims, to cover all modifications within the spirit and scope of this invention.

I claim:
1. A method for forming an oxidative catalytic surface on the metal wall of a cooking apparatus comprising:
   (a) cleaning the metal base;
   (b) applying a porcelain frit to the metal base;
   (c) drying the frit to a bisque;
   (d) applying a first coating of a slurry containing a catalyst and a material which, after processing becomes a high temperature binding agent;
   (e) firing the slurry-coated bisque at a temperature sufficient to fuse the porcelain frit;
   (f) coating the fired slurry-bisque with a second layer of the catalyst slurry; and
   (g) firing the second coating at a temperature sufficient to form the high temperature binding agent.

2. The method of claim 1 wherein the first coating of slurry is dried prior to firing the slurry-coated bisque.

3. The method of claim 2 wherein the slurry consists essentially of from 49.5 to 60.5% active catalyst, 33.0 to 40.0% water, 0.86 to 1.10% of material for formulation of a high temperature binding agent, based upon the final form, and from 1.25 to 1.5% wetting agent.

4. The method of claim 3 wherein the material which forms the high temperature binding agent is titanium lactate.

5. The method of claim 3 wherein the wetting agent is glycerol.

6. The method of claim 3 wherein the catalyst is a mixture of rare earth oxides.

References Cited
UNITED STATES PATENTS

| | | | |
|---|---|---|---|
| 3,266,477 | 8/1966 | Stiles | 126—19 |
| 3,271,322 | 9/1966 | Stiles | 126—19 X |
| 3,460,523 | 8/1969 | Stiles et al. | 126—19 |
| 3,545,423 | 12/1970 | Morgan | 117—129 X |

RALPH S. KENDALL, Primary Examiner

U.S. Cl. X.R.

117—129, 70 C; 126—19